(12) United States Patent
Gil et al.

(10) Patent No.: US 11,177,990 B1
(45) Date of Patent: Nov. 16, 2021

(54) ORBITAL ANGULAR MOMENTUM-BASED TRANSMITTER, RECEIVER, AND COMMUNICATION METHOD

(71) Applicant: KOREA ADVANCED INSTITUTE OF SCIENCE AND TECHNOLOGY, Daejeon (KR)

(72) Inventors: Gye Tae Gil, Daejeon (KR); Ju Yong Lee, Daejeon (KR); Dong Ho Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/984,702

(22) Filed: Aug. 4, 2020

(51) Int. Cl.
| | |
|---|---|
| *H04B 7/04* | (2017.01) |
| *H01Q 21/20* | (2006.01) |
| *H01Q 3/26* | (2006.01) |
| *H04L 27/26* | (2006.01) |
| *H01Q 19/10* | (2006.01) |
| *H01Q 19/06* | (2006.01) |

(52) U.S. Cl.
CPC ......... *H04L 27/2602* (2013.01); *H01Q 19/06* (2013.01); *H01Q 19/10* (2013.01); *H01Q 21/20* (2013.01)

(58) Field of Classification Search
CPC ............ H01Q 1/24; H01Q 3/34; H01Q 21/20; H01Q 21/24; H01Q 3/26; H01Q 3/28; H01Q 3/30; H01Q 19/06; H01Q 21/062; H04B 7/06; H04B 1/40; H04B 7/04; H04L 27/2602
See application file for complete search history.

(56) References Cited

U.S. PATENT DOCUMENTS

2019/0334609 A1* 10/2019 Alavi ..................... H01Q 21/20
2020/0388935 A1* 12/2020 Lee ......................... H01Q 1/246

FOREIGN PATENT DOCUMENTS

WO    WO-2019189705 A1 * 10/2019 ............. H01Q 21/20

* cited by examiner

*Primary Examiner* — Blane J Jackson
(74) *Attorney, Agent, or Firm* — Paratus Law Group, PLLC

(57) ABSTRACT

Provided are an orbital angular momentum (OAM)-based transmitter, receiver, and communication method employing a radial concentric uniform circular array (UCA). The OAM-based communication method includes transmitting, by a transmitter, OAM multimode signals through a UCA-based transmitting antenna and receiving, by a receiver, the OAM multimode signals through a radial concentric UCA structure antenna including a plurality of UCA antennas. The plurality of UCA antennas each have the same number of antenna elements, and antenna elements having the same sequence number in the plurality of UCA antennas are on the same radial line in the radial concentric UCA structure antenna.

16 Claims, 9 Drawing Sheets

Lens antenna

Transmission axis

Reflector

Signal propagation direction

Signal propagation direction

ORBITAL ANGULAR MOMENTUM-BASED TRANSMITTER, RECEIVER, AND COMMUNICATION METHOD

BACKGROUND

The following description relates to a technology for transmitting a plurality of signals using orbital angular momentum (OAM) multimodes in a wireless channel environment.

Orbital angular momentum (OAM) multiplexing is a technology for increasing the system capacity and the frequency efficiency of a wireless communication system by mode-division multiplexing OAM modes having different helical phase fronts through the same wireless communication channel.

According to the related art, uniform circular array (UCA)-based OAM systems have been researched. The related UCA-based OAM system employs a UCA having N antenna elements in a transmitter and a receiver.

The related UCA-based OAM system has problems in that OAM mode signals excluding a signal of mode 0 do not reach a long distance as the transmitter-receiver (T-R) distance increases in a line-of-sight (LoS) environment and there is a large difference in receive power between received mode signals. As a result, according to the related art, a channel condition number between multimode signals received by the transmitter is remarkably increased along with an increase in the T-R distance, and thus frequency efficiency of the system which can be achieved in a receive signal-to-noise ratio (SNR) condition is drastically reduced.

Consequently, the UCA-based OAM system field requires a new antenna structure and a precoding technology for obtaining increased channel capacity at a given T-R distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an orbital angular momentum (OAM)-based transmitter employing a radial concentric uniform circular array (UCA). The OAM-based transmitter includes a splitter configured to split a signal to be transmitted into signals corresponding to the number of antennas, a plurality of modulators configured to perform OAM modulation on each of the signals split by the splitter, and a radial concentric UCA structure antenna including the plurality of UCA antennas configured to transmit the signals modulated by the plurality of modulators.

In another aspect, there is provided an OAM-based receiver employing a radial concentric UCA. The OAM-based receiver includes a radial concentric UCA structure antenna including a plurality of UCA antennas configured to receive OAM multimode signals, a plurality of demodulators configured to individually demodulate the multimode signals received by the plurality of UCA antennas, a combiner configured to individually multiply the signals demodulated by the plurality of demodulators by combining weights and combine the weighted signals, and a symbol detector configured to detect a symbol in a signal combined by the combiner.

In yet another aspect, there is provided an OAM-based communication method employing radial concentric UCAs. The OAM-based communication method includes transmitting, by a transmitter, OAM multimode signals through a UCA-based transmitting antenna and receiving, by a receiver, the OAM multimode signals through a radial concentric UCA structure antenna including a plurality of UCA antennas.

The plurality of UCA antennas may have the same number of antenna elements, and antenna elements having the same sequence number in the plurality of UCA antennas may be on the same radial line in the radial concentric UCA structure antenna.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1:
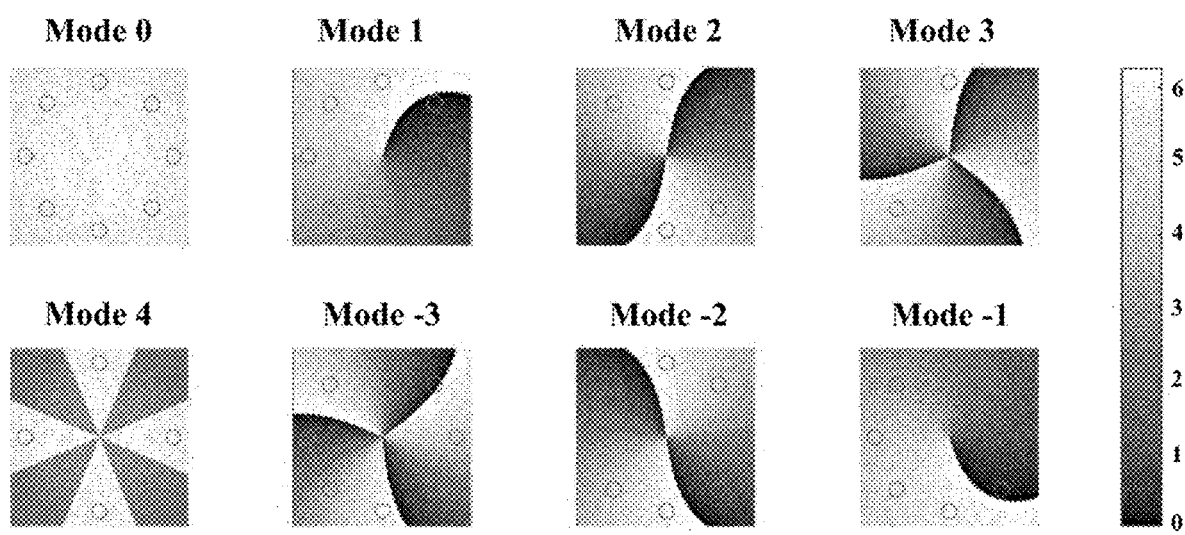
FIG. 1 shows examples of far-field phase fronts at a distance of 5 times the Rayleigh distance for orbital angular momentum (OAM) modes generated by an 8-element uniform circular array (UCA)

FIG. 1 shows examples of far-field phase fronts at a distance of 5 times the Rayleigh distance for orbital angular momentum (OAM) modes generated by an 8-element uniform circular array (UCA). FIG. 1 may propose the following idea.

As shown in FIG. 1, phase fronts of an OAM signal in a far-field region arrive at almost the same phase on the radial line around a transmission axis of the OAM signal. Therefore, a signal-to-noise ratio (SNR) may be obtained by diversity combining signals arriving on the radial line at a receiver of a UCA-based OAM system. Also, a transmitter of the UCA-based OAM system generates the same OAM mode signals which are constructively added in a far-field region using multiple concentric UCAs so that the SNR of an OAM mode may be improved.

Figure 2:
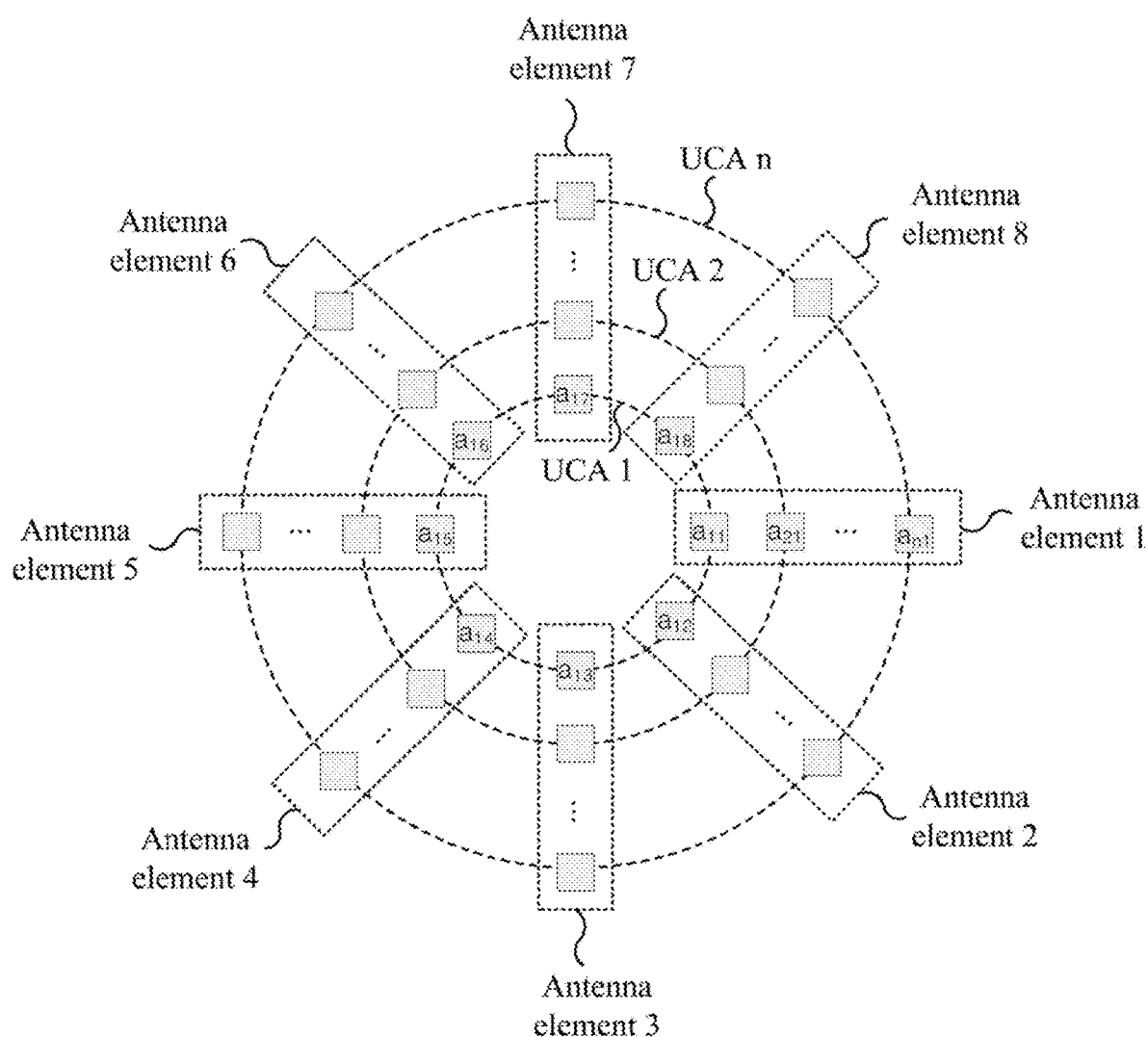
FIG. 2 shows an example of a concentric UCA.

A concentric UCA is described below. FIG. 2 shows an example of a radial concentric UCA. FIG. 2 is an exemplary structure for illustrating a radial concentric UCA.

FIG. 2 shows an example having n concentric circles. One concentric circle constitutes one UCA antenna. FIG. 2 is a concentric UCA including n UCA antennas UCA1, UCA2, . . . , and UCAn. A concentric UCA means a plurality of UCA antennas having different diameters. In the following description, $UCA_k$ indicates a $k^{th}$ UCA in a concentric UCA. A UCA of a transmitter may be referred to as a "transmit UCA," and a UCA of a receiver may be referred to as a "receive UCA."

FIG. 2 shows an example of eight antenna elements arranged on one concentric circle. An antenna element may be any one of various structures including a patch antenna. One UCA has eight antenna elements. Antenna elements have sequence numbers from 1 to 8. For example UCA 1 has antenna elements a11 to a18. In the same radial line of the concentric UCA, antenna elements having the same sequence number are arranged. Such a concentric UCA in which identical antenna elements are arranged on the same radial line of each UCA is referred to as a "radial concentric UCA." Meanwhile, an antenna system employing a radial concentric UCA is referred to as a "radial concentric UCA structure antenna" or a "radial concentric UCA structure antenna system."

Figure 3A:
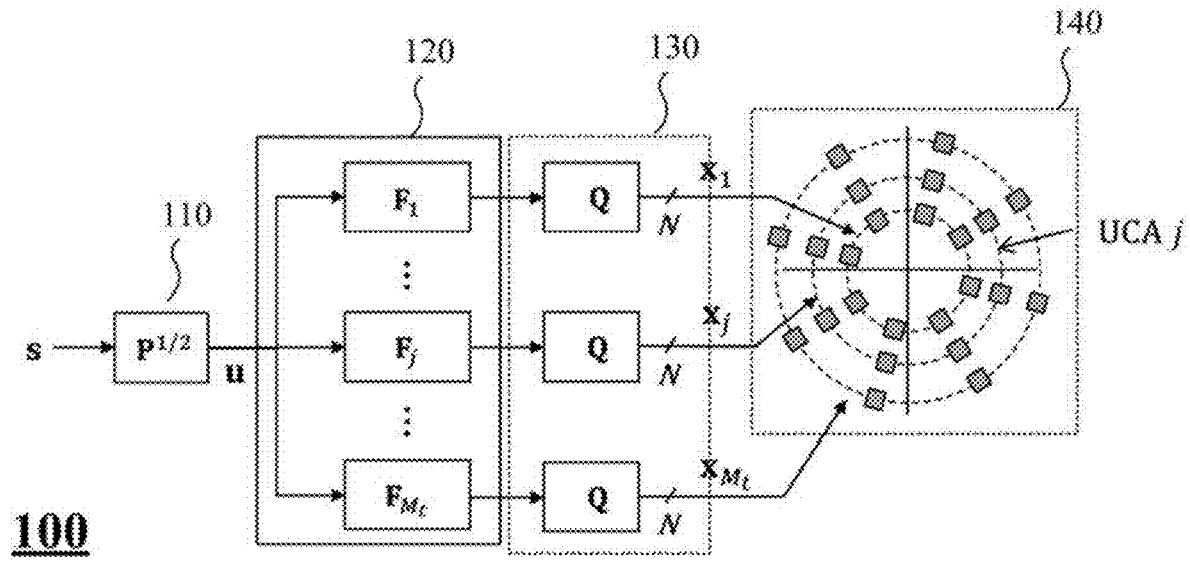
FIGS. 3A and 3B show an example of an OAM system model.
Figure 3B:
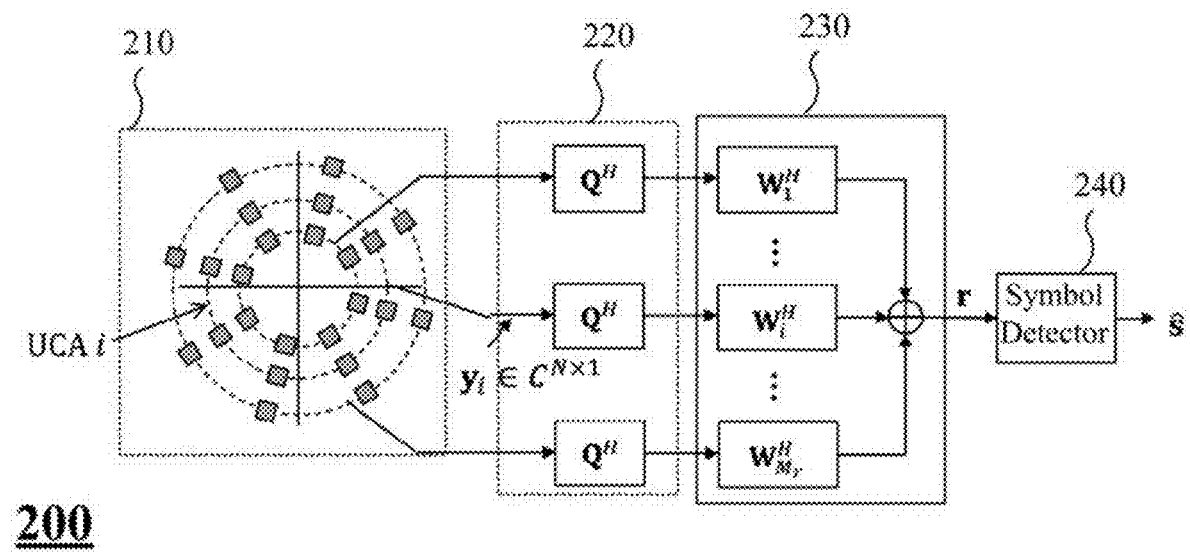

FIGS. 3A and 3B show examples of an OAM system model. FIGS. 3A and 3B are examples of radial concentric UCA-based OAM system model.

FIG. 3A shows an example of an OAM-based transmitter 100. The transmitter 100 includes a power allocator 110, a splitter 120, a modulator 130, and a transmitting antenna 140. The transmitter 100 transmits j signals x on the basis of an input signal s.

The power allocator 110 allocates power to the signal s for signal transmission and outputs a signal u. The splitter 120 distributes the signal u to a plurality of UCAs. The splitter 120 may correspond to a precoder. The modulator 130 performs OAM modulation. Signals output from the modulator 130 are transferred to the UCAs of the transmitting antenna 140. The transmitting antenna 140 is a radial concentric UCA structure antenna illustrated in FIG. 2. The transmitting antenna 140 has $M_t$ transmit UCA antennas.

A transmission signal of the transmitter 100 is described in a mathematical manner. $s \in C^{N \times 1}$ is a vector representing transmission signals. s is defined as $s=[s_1, s_2, \ldots, s_N]^T$ $P \in R^{N \times N}$ is a power allocation matrix. $Q \in C^{N \times N}$ is an N-point discrete Fourier transform (DFT) matrix. $F_j \in R^{N \times N}$ represents a splitter which distributes the output signal u of the power allocator 110 to the transmit UCAs. $F_j \in R^{N \times N}$ has $f_j(k)$ as a $k^{th}$ diagonal element. $W_i \in R^{N \times N}$ represents a combiner for signals received by receive UCAs. $W_i \in R^{N \times N}$ has $f_i(k)$ as a $k^{th}$ diagonal element.

As an example, the process of transmitting a $k^{th}$ transmission symbol $s_k$ through UCA j is described below.

First, the power allocator 110 obtains $u_k$ by multiplying the transmission symbol $s_k$ by a power allocation coefficient $\sqrt{p_k}$. The splitter 120 splits $u_k$ into $M_t$ branches. In each branch j, the splitter 120 multiplies $u_k$ by $f_j(k)$, which is the $k^{th}$ diagonal element of $F_j$, and outputs the product.

The modulator 130 performs OAM modulation on $u_k$ output from branch j according to a $k^{th}$ column $q_k$ of Q. UCA j of the transmitting antenna 140 transmits the modulated signal through individual antenna elements. A transmit UCA antenna may have $N_t$ antenna elements. The transmitting antenna 140 may transmit each of signals output from the modulator 130 to each individual UCA antenna. Alternatively, the transmitting antenna 140 may transmit at least one of the signals output from the modulator 130 to a specific UCA antenna which is mapped to the signal.

A signal related to $s_k$ transmitted through UCA j is represented as $q_k f_j(k) \sqrt{p_k} s_k$, and a signal $x_j \in C^{N \times 1}$ transmitted through UCA j is represented as shown in Expression 1 below.

$$x_j = \sum_{k=1}^{N} q_k f_j(k) \sqrt{p_k} \, s_k = QF_j P^{1/2} s \qquad \text{[Expression 1]}$$

FIG. 3B shows an example of an OAM-based receiver 200. The receiver 200 includes a receiving antenna 210, a demodulator 220, a combiner 230, and a symbol detector 240.

As an example, the process of obtaining a signal $r_k$ required to detect the $k^{th}$ transmit signal $s_k$ is described below.

The receiving antenna 210 includes $M_r$ receive UCA antennas. The receiving antenna 210 may receive OAM multimode signals. The receiving antenna 210 is a radial concentric UCA structure antenna. The receiving antenna 210 may have $N_r$ antenna elements. N OAM mode signals are mixed in a signal $y_i \in C^{N \times t}$ received by receive UCA i.

The demodulator 220 may demodulate a signal using an inverse discrete Fourier transform (IDFT) matrix. To obtain an OAM mode component carrying $s_k$ from a received signal, the demodulator 220 obtains $q_k^H y_i$ by multiplying $y_i$ by $q_k^H$.

The combiner 230 obtains a combined signal $r_k$ by multiplying $q_k^H y_i$ obtained from $M_r$ UCAs by a combining weight $w_i(k)$. $r_k$ is represented as $r_k = \sum_{i=1}^{M_r} w_i^*(k) q_k^H y_i$.

The symbol detector 240 obtains a detection value $\hat{s}_k$, of $s_k$ from $r_k$.

A transmitter may generate OAM multimode signals using different types of antennas, and even in this case, a receiver may use a radial concentric UCA as a receiving antenna. In other words, at least one of a transmitter and a receiver may use a radial concentric UCA. However, for convenience of description, an example in which each of a transmitter and a receiver uses a radial concentric UCA is described below.

There are $M_t$ transmit UCA antennas and $M_r$ receive UCA antennas. The transmit UCA antennas and the receive UCA antennas may have $N_t$ antenna elements and $N_r$ antenna elements, respectively. A case in which $N_t = N_r = N$ is described below. However, a technology described below may be applied even to a case in which a receiving antenna does not have the same configuration as a transmit antenna (e.g. $N_t \ne N_r$).

Figure 4:
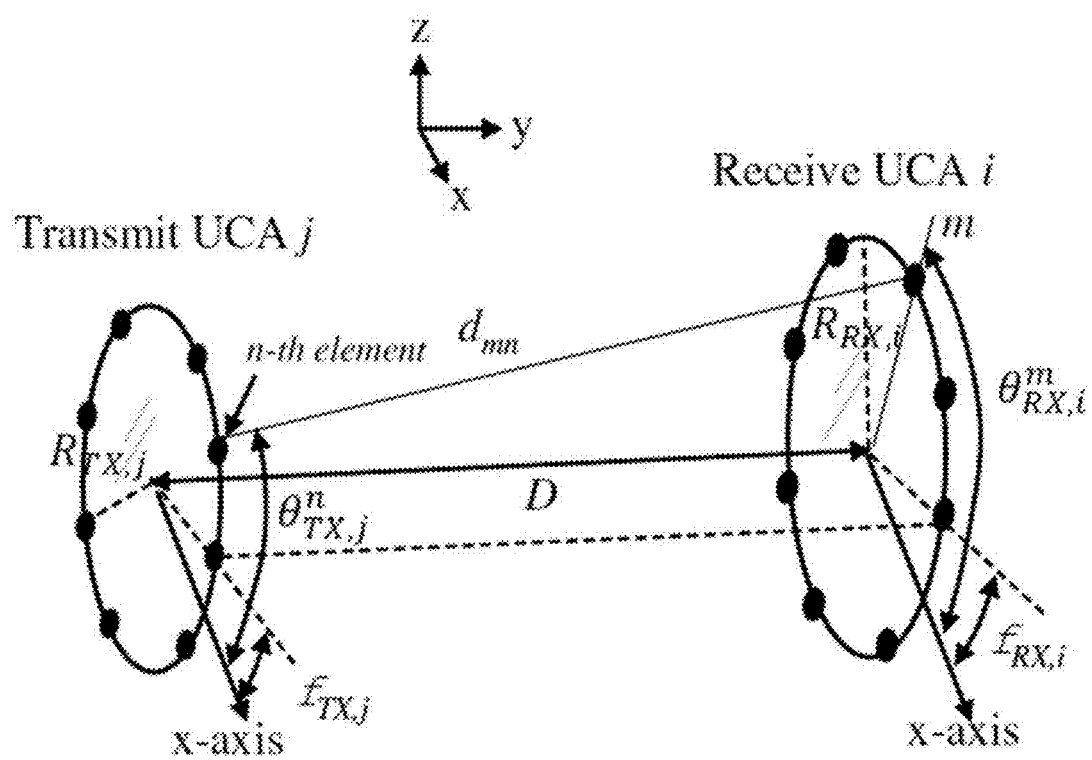
FIG. 4 shows an example of a channel model between a pair of UCA antennas.

FIG. 4 shows an example of a channel model between a pair of UCA antennas. FIG. 4 is an example of a case in which receive UCA i and transmit UCA j are ideally arranged. $R_{TXj}$ and $R_{TXi}$ represent the radius of transmit UCA j and receive UCA i, respectively. D is the distance between the centers of the transmit and receive UCAs. $\theta_{TX,j}^n$ represents the angle of an $n^{th}$ antenna element in transmit UCA j from the x-axis on the z-x plane. $\theta_{RX,i}^m$ represents the angle of an $m^{th}$ antenna element in receive UCA i from the x-axis on the z-x plane.

$$\theta_{TX,j}^n = \frac{2\pi(n-1)}{N} + \phi_{TX,j} \text{ and } \theta_{RX,i}^m = \frac{2\pi(m-1)}{N} + \phi_{RX,i}.$$

$\phi_{TX,j}$ and $\phi_{RX,i}$ are the angles of the first element of transmit UCA j and the first element of receive UCA i, respectively.

In this configuration, a distance $d_{m,n}$ between the $n^{th}$ element of the transmit UCA and the $m^{th}$ element of the receive UCA may be represented as $$d_{m,n} = (D^2 + R_{TX,j}^2 + R_{RX,i}^2 - 2R_{TX,j}R_{RX,i}\cos\theta_{m,n})^{1/2}.$$

$\theta_{m,n}$ is defined as $\theta_{m,n} = \theta_{RX,i}^m - \theta_{TX,j}^n = \frac{2\pi(m-n)}{N} + \phi_{RX,i} - \phi_{TX,j}$.

As shown in the right side of the above expression, $\theta_{m,n}$ is determined not by the values of m and n but by the difference (m−n). The distance $d_{m,n}$ becomes the same for a (m, n) pair with the same value of (m−n) mode N. Here, mode represents the modulo operation. When $\theta_{m,n}$ is the distance between two antenna elements, λ is a signal wavelength, and β is an antenna gain, a channel between the two antenna elements in free space is represented as $$h_{m,n} = \beta \frac{\lambda}{4\pi d_{m,n}} \exp\left(-j\frac{2\pi d_{m,n}}{\lambda}\right).$$

$H_{i,j} \in C^{N \times N}$ is defined as a UCA pair channel matrix between receive UCA i and transmit UCA j. Since all elements $\{h_{m,n}\}$ of $H_{i,j}$ with the same (m−n) mod N have the same value, $H_{i,j}$ becomes a circulant matrix. When an arbitrary N×N UCA pair channel matrix $H_{i,j}$ is circulant, $H_{i,j}$ may be decomposed as a function of an N-point DFT matrix Q and a diagonal matrix $\Delta_{i,j} \in C^{N \times N}$ having complex numbers $\{\delta_{i,j}(n)\}$ as elements as shown in Expression 2 below.

$$H_{i,j} = Q\Delta_{i,j}Q^H \quad \text{[Expression 2]}$$

Signal Model

The signal $x_j \in C^{N \times 1}$ transmitted through transmit UCA j is defined by Expression 1. When $M_t$ transmit UCAs simultaneously transmit the signals, the signal $y_i \in C^{N \times 1}$ received by receive UCA i is defined by Expression 3 below.

$$y_i = \sum_{j=1}^{M_t} H_{i,j}x_j + n_i = \sum_{j=1}^{M_t} H_{i,j}QF_jP^{1/2}s + n_i \quad \text{[Expression 3]}$$

Here, $n_i \sim N(0, \sigma_n^2 I_N)$ is additive white Gaussian noise.

An output signal $r \in C^{N \times 1}$ of the combiner, which is obtained by performing OAM modulation on the signals received by $M_r$ receive UCAs, multiplying the modulated signals by combining weights, and combining the weighted signals, is defined by Expression 4 below.

$$r = \sum_{i=1}^{M_r} W_i^H Q^H y_i = H_{OAM} P^{1/2} s + \eta \quad \text{[Expression 4]}$$

Here, $H_{OAM} \in C^{N \times N}$ is a matrix representing a concentric UCA OAM channel and is defined by Expression 5 below.

$$H_{OAM} = \sum_{i=1}^{M_r}\sum_{j=1}^{M_t} W_i^H Q^H H_{i,j} Q F_j = \sum_{i=1}^{M_r}\sum_{j=1}^{M_t} W_i^H \Delta_{i,j} F_j \quad \text{[Expression 5]}$$

η is defined as $\eta = \sum_{i=1}^{M_r} W_i^H Q^H n_i \in C^{N \times 1}$. Assuming that Expression 6 below is satisfied, it is determined that $\eta \sim N(0, \sigma_n^2 I_N)$.

$$\sum_{i=1}^{M_r} |w_i(k)|^2 = 1 \quad \text{[Expression 6]}$$

Meanwhile, in Expression 5, $\Delta_{i,j}$, $F_j$, and $W_i$ are all diagonal matrices which means that $H_{OAM}$ is also a diagonal matrix, and thus the $k^{th}$ element of r in Expression 4 is defined by Expression 7 below.

$$r_k = h_k\sqrt{p_k}s_k + \eta_k \quad \text{[Expression 7]}$$

$h_k$ is the $k^{th}$ element of $H_{OAM}$ and defined by Expression 8 below.

$$h_k = \sum_{i=1}^{M_r}\sum_{j=1}^{M_t} w_i^*(k)\delta_{i,j}(k)f_j(k) = w^H(k)D(k)f(k) \quad \text{[Expression 8]}$$

Here, D(k) is an $M_r \times M_t$ matrix having $\delta_{i,j}(k)$ as the $(i, j)^{th}$ element. w(k) and f(k) are defined by Expressions 9 and 10 below, respectively.

$$w(k) = [w_1(k), w_2(k), \ldots, w_{M_r}(k)]^T \quad \text{[Expression 9]}$$

$$f(k) = [f_1(k), f_2(k), \ldots, f_{M_t}(k)]^T \quad \text{[Expression 10]}$$

Expression 7 implies that when $H_{i,j}$ is circulant, N parallel channels without mutual interference are established through the concentric UCA OAM system shown in FIGS. 3A and 3B. A spectral efficiency achievable through this system becomes equal to the sum of spectral efficiencies of N independent channels as shown in Expression 11 below.

$$C_{CUCA} = \sum_{k=1}^{N} \log_2\left(1 + \frac{\sigma_s^2}{\sigma_n^2}|h_k|^2 p_k\right) \quad \text{[Expression 11]}$$

When the SNR of a concentric UCA OAM system is given, $\sigma_s^2/\sigma_n^2$ used in a channel capacity formula is calculated as follows. Assuming open-loop equal power allocation (i.e., when $$P = I_N \text{ and } F_j = \frac{1}{M_t}I_N),$$

it is calculated that $$y_i = \frac{1}{M_t}\sum_{j=1}^{M_t} H_{i,j}Qs + n_i.$$

In this case, the average SNR at each antenna element of the $i^{th}$ receive UCA becomes $$SNR_i = \frac{E\left[\left\|\frac{1}{M_t}\sum_{j=1}^{M_t} H_{i,j}Qs\right\|^2\right]}{E[\|n_i\|^2]} = \frac{\sigma_s^2 \left\|\frac{1}{M_t}\sum_{j=1}^{M_t} H_{i,j}\right\|_F^2}{N\sigma_n^2}.$$

The average SNR for all receive UCAs is defined by Expression 12 below.

$$SNR = \frac{\sigma_s^2}{N\sigma_n^2}\frac{1}{M_r}\sum_{i=1}^{M_r}\left\|\frac{1}{M_t}\sum_{j=1}^{M_t} H_{i,j}\right\|_F^2 \quad \text{[Expression 12]}$$
$$= \frac{\sigma_s^2}{N\sigma_n^2}\frac{1}{M_r}\sum_{i=1}^{M_r}\left\|\frac{1}{M_t}\sum_{j=1}^{M_t} \Delta_{i,j}\right\|_F^2$$

Here, since $H_{i,j}=Q\Delta_{i,j}Q^H$ in Expression 2 and $\|QAQ^H\|_F^2=\|A\|_F^2$ for an arbitrary square matrix A, the second equality may be obtained. $\sigma_s^2/\sigma_n^2$ may be calculated as shown in Expression 13 below.

$$\frac{\sigma_s^2}{\sigma_n^2} = N \frac{SNR}{\frac{1}{M_r}\sum_{i=1}^{M_r}\left\|\frac{1}{M_t}\sum_{j=1}^{M_t} H_{i,j}\right\|_F^2} \quad \text{[Expression 13]}$$

Optimal Design

An optimal design method for a concentric UCA OAM system is described below. The following description relates to an example of an optimization process of precoder/combiner weights for maximizing spectral efficiency achievable through a concentric UCA system under a total transit power constraint. The following description also indicates that a radial concentric UCA constitutes an optimal UCA OAM system.

The maximum power available for signal transmission at the transmitter is $P_{avail}$. Then, the problem of maximizing the spectral efficiency of a concentric UCA system may be defined by Expression 14 below.

$$\underset{p_1, p_2, \ldots, p_K}{\text{Maximize}} C = \sum_{k=1}^{N} \log_2\left(1 + \frac{\sigma_s^2}{\sigma_n^2}|h_k|^2 p_k\right) \quad \text{[Expression 14]}$$

subject to $$p_k \geq 0, \text{ for all } k$$

$$\sigma_s^2 \sum_{k=1}^{N} p_k \leq P_{avail}$$

Here, $h_k$ is represented as $h_k=w^H(k)D(k)f(k)$ in Expression 8 as a function of w(k), D(k), and f(k).

For a concentric UCA OAM system, constraints for P and $f_j(k)$ are found as follows.

First, in this system, $u=P^{1/2}s$, and the total transmit power satisfies $P_t=E[\|u\|^2]=\sigma_s^2 \text{tr}\{P\}=\sigma_s^2\Sigma_{k=1}^{N}p_k$, and $P_{avail}$ is equal to $E[\|s\|^2]=N\sigma_s^2$. Consequently, Expression 15 below is satisfied.

$$\sum_{k=1}^{N} p_k = N \quad \text{[Expression 15]}$$

Second, $s_k$ is transmitted using the $k^{th}$ column of the OAM modulator of each UCA. Therefore, the signal component of $s_k$ transmitted through UCA j is $q_k f_j(k)\sqrt{p_k}s_k$, and the total transmit power of all transmit UCAs associated with $s_k$ becomes $\Sigma_{j=1}^{M_t}E[\|q_k f_j(k)\sqrt{p_k}s_k\|^2]=\Sigma_{j=1}^{M_t}|f_j(k)|^2 p_k\sigma_s^2$. Since the total transmit power is equal to $p_k\sigma_s^2$, Expression 16 below is satisfied.

$$f(k)^2 = \sum_{j=1}^{M_t} |f_j(k)|^2 = 1 \quad \text{[Expression 16]}$$

The solution to the optimization problem of Expression 14 is obtained through the following two steps. Without loss of generality, it is assumed that the combining weight w(k) for $r_k$ satisfies Expression 17 below. This corresponds to the assumption of Expression 6.

$$\|w(k)\|^2 = 1 \quad \text{[Expression 17]}$$

Step 1: First, the optimal solutions of f(k) and w(k) which maximize $|h_k|^2$ for an arbitrary $p_k$ are calculated. Since $h_k=w^H(k)D(k)f(k)$ is obtained from Expression 8 and f(k) and w(k) satisfy Expressions 16 and 17, respectively, the optimization problem may be defined by Expression 18 below.

Maximize $|w^H(k)D(k)f(k)|^2$ subject to $\|f(k)\|^2=1$, $\|w(k)\|^2=1$ [Expression 18]

Solutions $f_{opt}(k)$ and $w_{opt}(k)$ to this optimization problem satisfy Expressions 19 and 20 below on the basis of Appendix A. Appendix A will be described below.

$$f_{opt}(k)=e^{j\phi_{f,D}}v_{D,max}(k) \quad \text{[Expression 19]}$$

$$w_{opt}(k)=e^{j\phi_{w,D}}u_{D,max}(k) \quad \text{[Expression 20]}$$

Here, $u_{D,max}(k)$ and $v_{D,max}(k)$ are left and right singular vectors corresponding to the maximum singular value $\sigma_{D,max}(k)$ of $D(k)$. $\phi_{w,D}$ and $\phi_{f,D}$ may be arbitrary constraints. $f(k)$ and $w(k)$ generally become complex numbers.

Step 2: Next, the optimum value of $p_k$ is calculated which may maximize the achievable spectral efficiency obtained by applying the optimum values of $f(k)$ and $w(k)$. When $f(k)$ and $w(k)$ satisfy Expressions 19 and 20, it is determined that $|h_k|^2=\sigma=\sigma_{D,max}^2(k)$. Accordingly, the problem of maximizing the achievable spectral efficiency in Expression 14 under the total transmit power constraint may be defined by Expression 21 below.

$$\underset{p_1,p_2,\ldots,p_K}{\text{maximize}} C = \sum_{k=1}^{N} \log_2\left(1 + \frac{\sigma_s^2}{\sigma_n^2}\sigma_{D,max}^2(k)p_k\right) \quad \text{[Expression 21]}$$

subject to $$p_k \geq 0, \text{ for all } k$$

$$\sigma_s^2\sum_{k=1}^{N} p_k \leq P_{avail}$$

Here, $\sigma_{D,max}(k)=w_{opt}^H(k)D(k)f_{opt}(k)$. As a result, the solution to this optimization problem becomes a waterfilling solution which may lead to Expression 22 below.

$$p_k = \max\left(0,\left(P_{avail}-\left(\frac{\sigma_s^2}{\sigma_n^2}\sigma_{D,max}^2(k)\right)^{-1}\right)\right) \quad \text{[Expression 22]}$$

When the transmitter-receiver (T-R) distance is longer than the Rayleigh distance $d_R$, an optimal solution for the precoder/combiner may be calculated as follows. When a distance D between transmit and receive UCAs is in a far-field distance region, that is, $D > d_R$, Expression 23 below is satisfied.

$$D \gg R_{TX,j} \text{ and } D \gg R_{RX,j} \quad \text{[Expression 23]}$$

Accordingly, $\delta_{i,j}(k)$ which is the $k^{th}$ diagonal element of A, may be approximated by Expression 24 below.

$$\delta_{i,j}(k)=Ng_D j^k J_k(2\pi S_{i,j})e^{jk(\phi_{RX,i}-\phi_{TX,j})} \quad \text{[Expression 24]}$$

Here, $J_k(\bullet)$ is the $k^{th}$ order Bessel function of the first kind. $g_D$ is defined by Expression 25 below, and $S_{i,j}$ is defined by Expression 26 below.

$$g_D = \beta\frac{\lambda}{4\pi D}e^{-j\frac{2\pi D}{\lambda}} \quad \text{[Expression 25]}$$

$\beta$ is a variable representing the gain of a transceiver antenna and is a constant in the case of an omnidirectional antenna.

$$S_{i,j} = \frac{R_{TX,j}R_{RX,i}}{\lambda D} \quad \text{[Expression 26]}$$

Accordingly, Expression 27 below is obtained by substituting Expression 25 into Expression 24.

$$\delta_{i,j}(k)=c(k)a_{i,j}(k)e^{jk(\phi_{RX,i}-\phi_{TX,j})} \quad \text{[Expression 27]}$$

Here, $c(k)$ and $a_{i,j}(k)$ are defined below by Expressions 28 and 29, respectively.

$$c(k) = N\beta j^k \frac{\lambda}{4\pi D}e^{-j\frac{2\pi D}{\lambda}} \quad \text{[Expression 28]}$$

$$a_{i,j}(k) = J_k\left(\frac{2\pi}{\lambda}\frac{R_{TX,j}R_{RX,i}}{D}\right) \quad \text{[Expression 29]}$$

Expression 27 may be written in a matrix form with respect to all (i, j) pairs as defined by Expression 30.

$$D(k)=c(k)C_R^H(k)A(k)C_T(k) \quad \text{[Expression 30]}$$

Here, $c(k)$ is defined by Expression 31 below, and $C_R(k)$ and $C_T(k)$ are diagonal matrices having $$\{e^{jk\phi_{RX,1}},\ldots,e^{jk\phi_{RX,M_r}}\} \text{ and } \{e^{jk\phi_{TX,1}},\ldots,e^{jk\phi_{TX,M_t}}\}$$

as diagonal elements, respectively. $A(k) \in \mathbb{R}^{M_r \times M_t}$ is a real matrix having $a_{i,j}(k)$ as the $(i, j)^{th}$ element.

$$c(k) = N\beta j^k \frac{\lambda}{4\pi D}e^{-j\frac{2\pi D}{\lambda}} \quad \text{[Expression 31]}$$

Using Expression 30, the optimization problem in Expression 18 may be redefined by Expression 32 below.

Maximize $|w^H(k)C_R^H(k)A(k)C_T(k)f(k)|^2$ subject to $\|f(k)\|^2=1, \|w(k)\|^2=1$ [Expression 32]

The solutions $f_{opt}(k)$ and $w_{opt}(k)$ to this optimization problem may be obtained through Appendix A as defined below by Expressions 33 and 34, respectively.

$$f_{opt}(k)=e^{j\phi_{f,A}}C_T^*(k)v_{A,max}(k) \quad \text{[Expression 33]}$$

$$w_{opt}(k)=e^{j\phi_{w,A}}C_R^*(k)u_{A,max}(k) \quad \text{[Expression 34]}$$

Here, $u_{A,max}(k)$ and $v_{A,max}(k)$ are left and right singular vectors corresponding to the maximum singular value $\sigma_{A,max}(k)$ of $A(k)$. When all elements of $C_T(k)$ and $C_R(k)$ have the same phase $\phi_{f,A}$ and $\phi_{w,A}$ (i.e., $\phi_{TX,j}=\phi_{f,A}$ for all j, $\phi_{RX,i}=\phi_{w,A}$ for all i), $f_{opt}(k)$ and $w_{opt}(k)$ satisfy Expressions 35 and 36 below.

$$f_{opt}(k)=v_{A,max}(k) \quad \text{[Expression 35]}$$

$$w_{opt}(k)=u_{A,max}(k) \quad \text{[Expression 36]}$$

In this case, $f_{opt}(k)$ and $w_{opt}(k)$ become real vectors. This is because $u_{A,max}(k)$ and $v_{A,max}(k)$, which are the singular vectors of the real matrix $A(k)$, have real elements. When $f_{opt}(k)$ and $w_{opt}(k)$ determined by Expressions 35 and 36 are used, the implementation complexity of the precoder/combiner is reduced to one half compared to a case in which the complex vectors of Expressions 19 and 20 are used.

As such, an OAM transmission system using a concentric UCA in which all elements of $C_T(k)$ and $C_R(k)$ have the same phase $\phi_{f,A}$ and $\phi_{w,A}$ ($\phi_{TX,j}=\phi_{f,A}$ for all j, $\phi_{RX,i}=\phi_{w,A}$ for all i) is referred to as a "radial concentric UCA OAM system."

When the T-R distance D is near infinitive or much longer than the radius of UCA(D is longer than far-filed distance region), the optimal solutions of f(k) and w(k) of a radial concentric UCA are approximated as defined below by Expressions 37 and 38, respectively.

$$w_{opt}(k) = \frac{1}{M_r} 1_{M_r} \quad \text{[Expression 37]}$$

$$f_{opt}(k) = \frac{1}{M_t} 1_{M_t} \quad \text{[Expression 38]}$$

When the T-R distance D is near infinitive or much longer than the radius of UCA, the optimal solutions of f(k) and w(k) may be approximated as defined below by Expression 39.

$$\lim_{D \to \infty} a_{i,j}(k) = \lim_{D \to \infty} J_k\left(\frac{2\pi}{\lambda} \frac{R_{TX,j} R_{RX,i}}{D}\right) \quad \text{[Expression 39]}$$
$$= \begin{cases} 1, & k = 0 \\ \varepsilon, & \text{otherwise} \end{cases}$$

Here, ε represents a very small value close to 0. This is because $$u_{A,max}(k) = \frac{1}{M_r} 1_{M_r} \text{ and } v_{A,max}(k) = \frac{1}{M_t} 1_{M_t}.$$

The spectral efficiency achievable through the concentric UCA OAM system is represented as $$C_{CUCA} = \sum_{k=1}^{N} \log_2\left(1 + \frac{\sigma_s^2}{\sigma_n^2} |h_k|^2 p_k\right).$$

Here, $|h_k|^2 = |w^H(k) D(k) f(k)|^2$, and the maximum value thereof is $\sigma_{D,max}^2(k)$ which is the maximum eigenvalue of $D(k) D^H(k)$. Since $\sigma_{D,max}^2(k) \le \mathrm{tr}\{D(k) D^H(k)\} = \sum_{i=1}^{M_r} \sum_{j=1}^{M_t} |\delta_{i,j}(k)|^2$ and $|\delta_{i,j}(k)|^2 \le |\delta_{i,j}^{max}(k)|^2$, $\sigma_{D,max}(k) \le M_r M_t |\delta_{i,j}^{max}(k)|^2$. Accordingly, the upper bound of the achievable spectral efficiency of the concentric UCA OAM system is defined by Expression 40 below.

$$C_{CUCA} \le \sum_{k=1}^{N} \log_2\left(1 + \frac{\sigma_s^2}{\sigma_n^2} M_r M_t |\delta_{i,j}^{max}(k)|^2 p_k\right) \quad \text{[Expression 40]}$$

From Expression 40, it may be seen that the capacity of the concentric UCA OAM system increases monotonically with $M_r M_t$ in the form of a log function.

In the case of a far-field region, Expression 27 may be defined by Expression 41 below.

$$|\delta_{i,j}(k)|^2 = N^2 \beta^2 \left(\frac{\lambda}{4\pi D}\right)^2 |J_k(2\pi S_{i,j})|^2 |\delta_{i,j}^{max}(k)|^2 \quad \text{[Expression 41]}$$

of Expression 40 is defined by Expression 42 below.

$$|\delta_{i,j}^{max}(k)|^2 = N^2 \beta^2 \left(\frac{\lambda}{4\pi D}\right)^2 \max_{i,j} |J_k(2\pi S_{i,j})|^2 \quad \text{[Expression 42]}$$

Here, $S_{i,j}$ is defined by Expression 26. Accordingly, it may be seen that the capacity of a concentric UCA OAM system in a far-field region increases monotonically with N and decreases monotonically with D.

When $p_k = 1/N$, the spectral efficiency of a single UCA system with $M_t = M_r = 1$, in which a radius $R_{TX}$ of a transmit UCA equals $\max\{R_{TX,j}\}$ and a radius $R_{RX}$ of a receive UCA equals $\max\{R_{RX,i}\}$, is defined by Expression 43 below.

$$C_{UCA} = \sum_{k=1}^{N} \log_2\left(1 + \frac{\sigma_s^2}{N \sigma_n^2} |\delta_{1,1}(k)|^2\right) \quad \text{[Expression 43]}$$

The capacity gain of a concentric UCA OAM system versus a single UCA OAM system is defined by Expression 44 below.

$$\frac{C_{CUCA}}{C_{UCA}} \le \frac{\sum_{k=1}^{N} \log_2\left(1 + \frac{\sigma_s^2}{\sigma_n^2} M_r M_t |\delta_{i,j}^{max}(k)|^2 p_k\right)}{\sum_{k=1}^{N} \log_2\left(1 + \frac{\sigma_s^2}{N \sigma_n^2} |\delta_{1,1}(k)|^2\right)} \quad \text{[Expression 44]}$$
$$\cong \frac{\log_2\left(1 + \frac{M_t M_r}{N} SNR\right)}{\log_2\left(1 + \frac{1}{N} SNR\right)}$$

For example, assuming that $\delta_{i,j}^{max}(k) = \delta_{1,1}(k)$, $N=8$, and $M_t = M_r = 8$, the upper bound of a capacity gain which is obtainable under a condition of SNR=20 dB is calculated to be 2.5688.

Experimental results for verifying the effectiveness of the above-described radial concentric UCA OAM system are described below. Parameters used in a simulation are shown in Table 1 below. In the simulation, a carrier frequency is 140 GHz, a radial concentric UCA including $M_t$ UCAs is used as the transmitter, and a radial concentric UCA including $M_r$ UCAs is used as the receiver. Each UCA has eight antenna elements. The radius of a radial concentric UCA is 25λ, and a gain β of the transmit and receive antennas is equal to 2. This indicates the assumption that the gain of the transmit antenna is 3 dB and the gain of the receive antenna is 0 dB. In the case of a transmit radial concentric UCA including $M_t$ element UCAs, the radius of the $i^{th}$ UCA is $25\lambda - (j-1)\lambda/2$.

TABLE 1

| Simulation Parameters | |
| --- | --- |
| Parameter | Value |
| Carrier frequency | 140 GHz |
| Antenna type | Radial UCA |
| N | 8 |
| UCA radius | $R_{TX} = R_{RX} = 25\lambda$ |
| Antenna gain | $\beta = 2$ |
| SNR | 20 dB |

The following five transmission schemes are used in the simulation. For all the transmission schemes, it is assumed that a radial concentric UCA including $M_rN$ and $M_rN$ antenna elements are used at the transmitter side and the receiver side, respectively. Hereinafter, a radial concentric UCA is simply referred to as "RCUCA."

(1) Open-Loop MIMO System

A channel matrix $H_{MIMO}$ of a MIMO system including $M_t$ transmit UCAs and $M_r$ receive UCAs becomes an $M_rN \times M_tN$ matrix which has $H_{i,j}$ of Expression 2 as the $(i, j)^{th}$ submatrix. The received signal becomes $y=H_{MIMO}s+n$. Here, $y \in C^{NM_r \times 1}$ and $H_{MIMO} \in C^{NM_r \times NM_t}$. The capacity of the open-loop MIMO channel is defined by Expression 45 below.

$$C_{OL-MIMO} = \log_2 \det\left(I_{NM_r} + \frac{\sigma_{s,MIMO}^2}{\sigma_n^2} H_{MIMO} H_{MIMO}^H\right)$$ [Expression 45]

In this open-loop MIMO system, the transmitter transmits $M_tN$ symbols with equal power without channel information feedback from the receiver to the transmitter. The SNR of this system is $$SNR = \frac{\sigma_{s,MIMO}^2}{NM_r\sigma_n^2} \|H_{MIMO}\|_F^2.$$

Accordingly, $$\frac{\sigma_{s,MIMO}^2}{\sigma_n^2}$$

required for obtaining a particular SNR is given as $$\frac{\sigma_{s,MIMO}^2}{\sigma_n^2} = \frac{NM_r \cdot SNR}{\|H_{MIMO}\|_F^2}.$$

(2) Open-Loop RCUCA-OAM System

This system is an OAM transmission system which employs an RCUCA and in which Expressions 37 and 38 are applied to the precoder and the combiner, respectively.

In this system in which a transmitter includes $M_t$ transmit UCAs and an IDFT precoder and a receiver includes $M_r$ receive UCAs and a DFT filter, a channel response is represented as an $N \times N$ matrix $H_{OAM}$ as shown in Expression 46 below.

$$H_{RUCA} = \frac{1}{M_rM_t}\sum_{i=1}^{M_r}\sum_{j=1}^{M_t} Q^H H_{i,j} Q$$ [Expression 46]

$$= \frac{1}{M_rM_t}\sum_{i=1}^{M_r}\sum_{j=1}^{M_t} \Delta_{i,j}$$

The channel capacity is defined by Expression 47.

$$C_{OL-RCUCA} = \log_2 \det\left(I_N + \frac{\sigma_s^2}{\sigma_n^2} H_{RUCA} H_{RUCA}^H\right)$$ [Expression 47]

In this system, the SNR is defined by Expression 12, and $$\frac{\sigma_s^2}{\sigma_n^2}$$

required for obtaining a specific SNR is $$\frac{\sigma_s^2}{\sigma_n^2} = \frac{N \cdot SNR}{\frac{1}{M_r}\sum_{i=1}^{M_r}\left\|\frac{1}{M_t}\sum_{j=1}^{M_t} H_{i,j}\right\|_F^2}.$$

(3) Closed-Loop MIMO System

A closed-loop MIMO system employs singular value decomposition (SVD)-based precoding/equalization and water-filling power allocation. In this system, the channel matrix may be decomposed as $H_{MIMO}=U\Sigma V^H$. Parallel channels represented as $\Sigma$ may be established by precoding with $V$ at the transmitter and by filtering with $U^H$ at the receiver. When the $k^{th}$ singular value of $H_{MIMO}$ is represented as $\sigma_k$ and a power allocation coefficient is defined as $p_k$, the channel capacity of this system is defined by Expression 48 below. The channel capacity is maximized when water-filling power allocation is employed.

$$C_{CL-MIMO} = \sum_{k=1}^{\mathcal{R}} \log_2\left(1 + \frac{\sigma_{s,MIMO}^2}{\sigma_n^2}\sigma_k^2 p_k\right)$$ [Expression 48]

Here, $\mathcal{R}$ is the rank of $H_{MIMO}$.

(4) Closed-Loop RCUCA-OAM with Optimal Design

This system is an RCUCA system as shown in FIGS. 3A and 3B to which the optimal solution of Expression 19 to Expression 21 is applied. This system performs precoding with $F_j$ for transmit UCA j and performs filtering with $W_i^H$ for receive UCA i. In this system, an $N \times N$ channel $H_{OAM}$ defined by Expression 5 is established, and water-filling power allocation is employed. When a power allocation coefficient is defined as $p_k$ and $h_k$ is defined by Expression 8, the channel capacity of this system is defined by Expression 49 below.

$$C_{CL-RCUCA} = \sum_{k=1}^{N} \log_2\left(1 + \frac{\sigma_s^2}{\sigma_n^2}|h_k|^2 p_k\right)$$ [Expression 49]

(5) Closed-Loop RCUCA-OAM with Far-Field Approximation

This system is an RCUCA system as shown in FIGS. 3A and 3B to which the optimal solution of Expressions 35, 36, and 21 is applied. In this system, the precoding, receiver filtering, and power allocation methods are the same as those of the closed-loop RCUCA-OAM with optimal design. The channel capacity is also defined by Expression 49.

TABLE 2

| | Computational Complexity | | |
|---|---|---|---|
| | Real Multiplications | Real Additions | FFTs |
| Open-loop MIMO | 0 | 0 | |
| Open-loop RCUCA-OAM | 0 | 0 | |
| Closed-loop MIMO | $4M_tNR + 2R$ | $4M_tNR - 2M_tN$ | |
| Closed-loop RCUCA-OAM with optimal design | $4M_tN$ | $2NM + 2N$ | $M_t$ |
| Closed-loop RCUCA-OAM with far-field approximation | $2M_tN$ | $2N$ | $M_t$ |

TABLE 3

| | Feedback Overhead | |
|---|---|---|
| | # of words | Feedback Information |
| Closed-loop MIMO | $2M_tNR + 2R$ | $V \in C^{M_tN \times \mathcal{R}}$ <br> $\text{diag}(P) \in R^{\mathcal{R} \times 1}$ |
| Closed-loop RCUCA-OAM | $M_tN + N$ | $F \in R^{M_t \times N}$ <br> $\text{diag}P \in R^{N \times 1}$ |

Tables 2 and 3 show the computational complexity of the precoders and the feedback overheads for each of the three transmission schemes, respectively.

In an open-loop MIMO system and the open-loop RCUCA-OAM system, the complexity of precoding is 0 because precoding is not employed. The open-loop RCUCA-OAM system requires only one fast Fourier transform (FFT). This is because OAM modulation may be performed by using one FFT rather than $M_t$ FFTs, and then the output of the OAM modulator may be split to $M_t$ UCAs.

In a closed-loop MIMO system, when the rank of $H_{MIMO}$ is $\mathcal{R}$, $2\mathcal{R}$ real multiplications are required for power allocation, and $M_tN \times \mathcal{R}$ complex multiplications and $M_tN \times (\mathcal{R}-1)$ complex additions are required for precoding with the right singular matrix. In a closed-loop RCUCA-OAM system with optimal design, 2N real additions are required for power allocation, N complex multiplications are required for multiplying u by $F_j$ in each of the $M_t$ branches, and an N-dimensional FFT is required for OAM modulation in each of the $M_t$ branches. A closed-loop RCUCA-OAM system with far-field approximation is different from the closed-loop RCUCA-OAM system with optimal design in that 2N real multiplications are required for multiplying u by $F_j$ in each of the $M_t$ branches.

Therefore, one complex multiplication equals four real multiplications+two real additions, and one complex addition equals two real additions. In this case, the precoder of the closed-loop MIMO system requires $4M_tN\mathcal{R} + 2\mathcal{R}$ real multiplications and $2M_tN\mathcal{R} + 2M_tN(R-1)$ real additions, the closed-loop RCUCA-OAM system with optimal design requires $4M_tN$ real multiplications, $2NM_t+2N$ real additions, and an FFT operation having the complexity of $\mathcal{O}(N \log(N))$, and the closed-loop RCUCA-OAM system with far-field approximation requires $2M_tN$ real multiplications, 2N real additions, and an FFT operation having the complexity of $\mathcal{O}(N \log(N))$.

In the case of feedback overhead, the feedback parameters in a closed-loop MIMO system are the right singular matrix V and the power allocation matrix, which requires the feedback of $2M_tN\mathcal{R} + \mathcal{R}$ words, and the feedback parameters in a closed-loop RCUCA-OAM system are F and the power allocation matrix, which requires the feedback of $M_tN+N$ words.

Consequently, it is possible to see from Tables 2 and 3 that when the rank of $H_{MIMO}$ is $\mathcal{R}$, the RCUCA-OAM scheme has about $\mathcal{O}(\log(N)/\mathcal{R})$ times the precoder complexity of the MIMO scheme and about $1/(2\mathcal{R})$ times the feedback overhead of the MIMO scheme.

Figure 5:
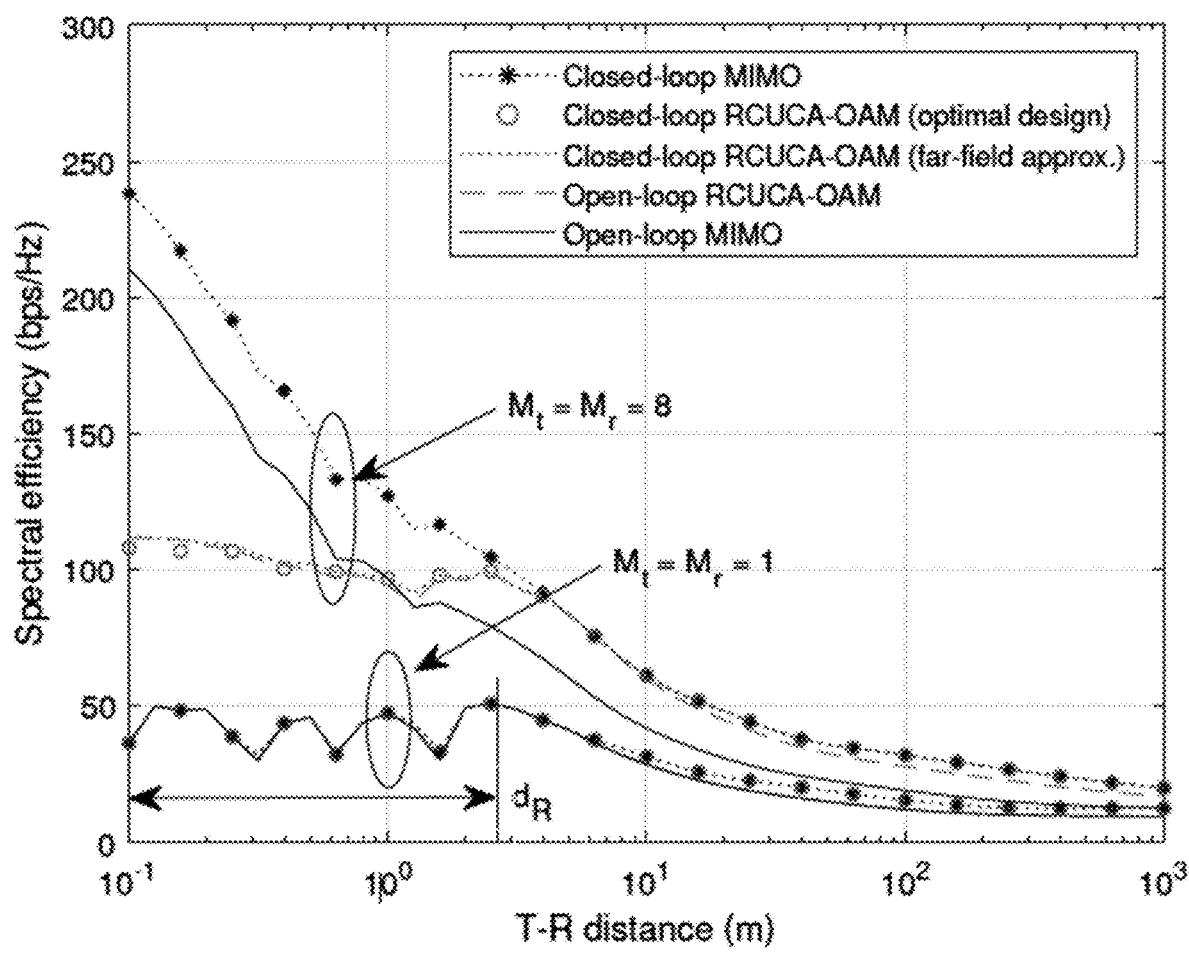
FIG. 5 is a graph showing spectral efficiency of a multiple input multiple output (MIMO) system and a radial concentric UCA (RCUCA)-OAM system versus transmitter-receiver (T-R) distance.

FIG. 5 is a graph showing spectral efficiency of a MIMO system and a RCUCA-OAM system versus T-R distance. In FIG. 5, the spectral efficiency of a MIMO system and the RCUCA-OAM system versus T-R distance is plotted at an SNR of 20 dB in the case of $M_t=1$ and in the case of $M_t=8$. In FIG. 5, $d_R$ is the Rayleigh distance of the UCA pair system with $M_t=1$, which is calculated by $$d_R = \frac{2R_{TX}R_{RX}}{\lambda} \text{ when } N = 8.$$

When a 140 GHz carrier frequency is used, $d_R$ is 2.6786 m. The following characteristics are observed in the graph.

First, in the case of a single UCA system with $M_t=1$, both the MIMO system and the RCUCA-OAM system in the near-field region in which the T-R distance is shorter than the Rayleigh distance have the same level of spectral efficiency regardless of whether an open-loop or a closed-loop is used. In a far-field zone in which the T-R distance is greater than the Rayleigh distance, the spectral efficiency of closed-loop MIMO system and the closed-loop RCUCA-OAM system has a higher value than that of an open-loop system. These results are considered to be caused by an improvement in spectral efficiency which is due to water-filling power allocation in the single UCA system.

Second, in the case of $M_t=8$, the closed-loop RCUCA-OAM system with optimal design and the closed-loop RCUCA-OAM system with far-field approximation show the similar level of spectral efficiency at any T-R distance. Particularly, even in a near-field zone, the performance of the closed-loop RCUCA-OAM system with optimal design does not reach that of the closed-loop MIMO system. Although the rank of a channel is greater than N in the near-field zone, only N OAM modes are used in the closed-loop RCUCA-OAM system, and thus MIMO channel capacity is not fully used. In the near-field zone, it is observed that the RCUCA-OAM system has a channel gain which is about double the channel capacity of a single UCA OAM system. This coincides with the upper bound of a capacity gain being estimated to be 2.5688 on the basis of Expression 44.

Third, the closed-loop MIMO system has highest spectral efficiency at any T-R distance. The closed-loop RCUCA-OAM system has a relatively low level of spectral efficiency in the near-field zone but has a spectral efficiency which is close to that of the closed-loop MIMO system in the far-field zone.

In addition, it is observed that the open-loop RCUCA-OAM system has a spectral efficiency close to that of the closed-loop RCUCA-OAM system in both the near-field zone and the far-field zone. Such a result is obtained in the far-field zone because the optimal precoding weights of the closed-loop RCUCA-OAM system in the far-field zone are defined by Expressions 37 and 38. The reason that the closed-loop RCUCA-OAM system does not have a higher spectral efficiency than the open-loop RCUCA-OAM system in the near-field zone is that the RCUCA-OAM system is modeled through far-field approximation. In the far-field zone, the open-loop RCUCA-OAM system shows a spectral efficiency close to that of the close-loop MIMO system despite zero feedback overhead.

Figure 6:
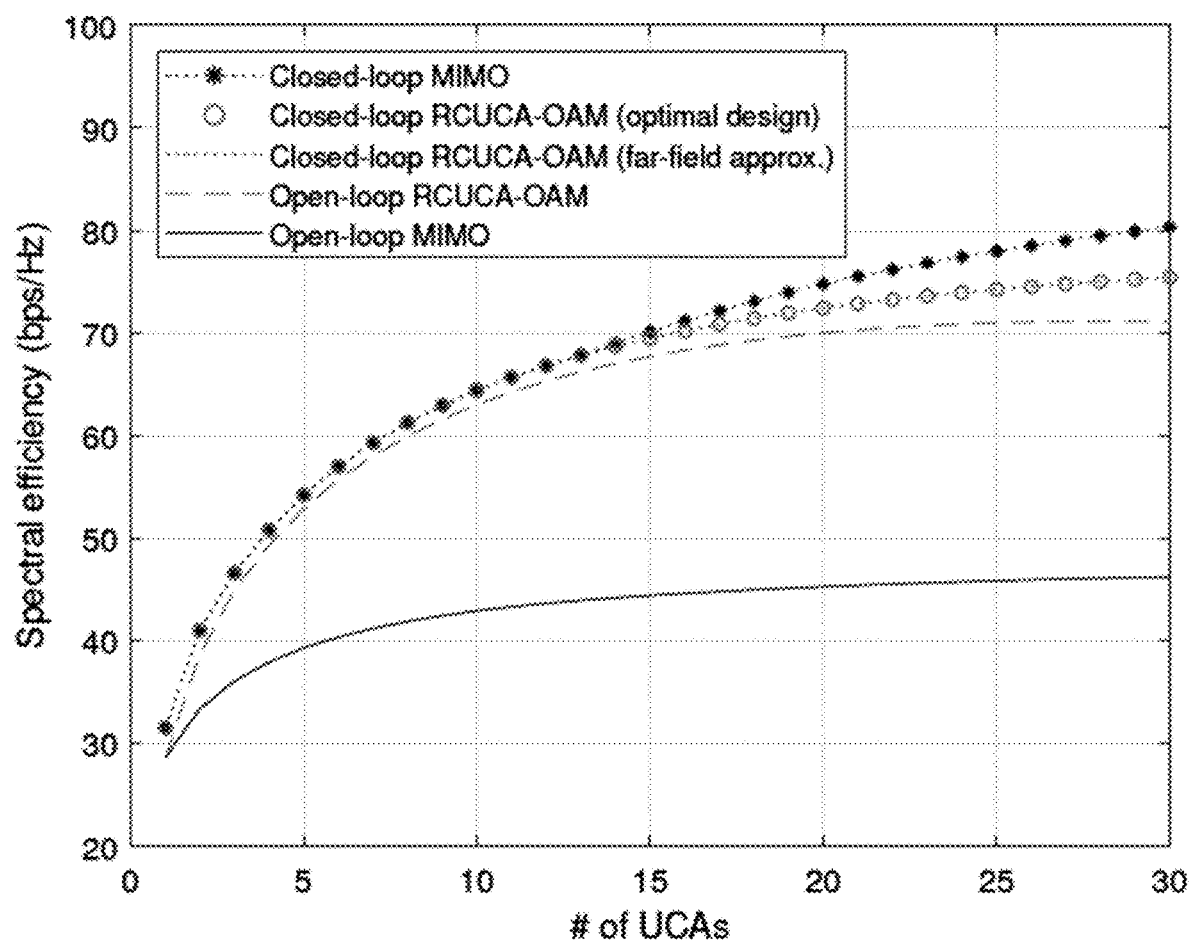
FIG. 6 is a graph showing the relationship between the number of UCAs and far-field spectral efficiency.

FIG. 6 is a graph showing the relationship between the number of UCAs and far-field spectral efficiency. In FIG. 6, the spectral efficiency of the five transmission schemes according to the number of UCAs is plotted when an SNR is 20 dB and the T-R distance is 10 m.

First, at the T-R distance of 10 m, the spectral efficiencies of the five transmission schemes increase monotonically with the number of UCAs in the form of a logarithmic function. This is consistent with the analysis in Expression 40. This indicates that placing as many UCAs as possible in a given area helps to improve the channel capacity.

In all the cases, the closed-loop MIMO system employing SVD precoding and water-filling power allocation shows the highest spectral efficiency. The closed-loop RCUCA-OAM system employing water-filling power allocation and optimal precoding has the second highest spectral efficiency. Particularly, when the number of UCAs is 12 or less, the closed-loop RCUCA-OAM system has almost the same spectral efficiency as the closed-loop MIMO system. The performance gap between the two systems increases as the number of UCAs increases over 12. This is an advantage of the closed-loop RCUCA-OAM system considering its feedback overhead amounting to $1/(2\mathcal{R})$ times that of the closed-loop MIMO system.

The open-loop RCUCA-OAM system at the T-R distance of 10 m in the far-field zone shows spectral efficiency which is significantly higher than that of the open-loop MIMO system and close to 90% of that of the closed-loop MIMO system despite precoding and zero feedback overhead. This is because the optimal precoding weights of the closed-loop RCUCA-OAM system in the far-field zone are determined by Expressions 37 and 38.

Figure 7A:
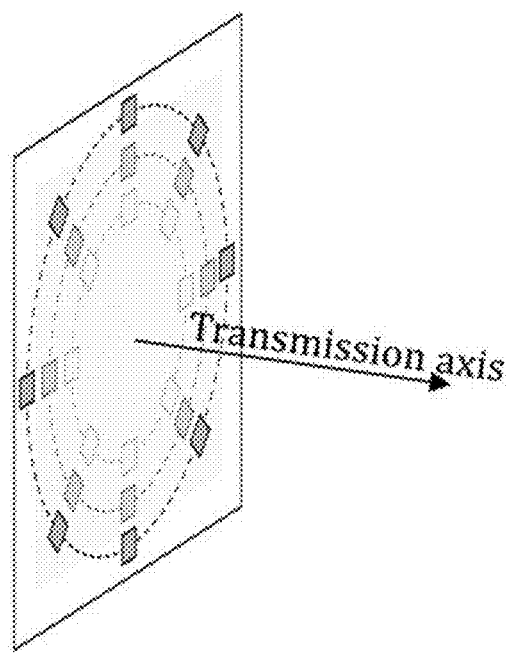
FIGS. 7A to 7C show examples of concentric UCA structure antennas.
Figure 7B:
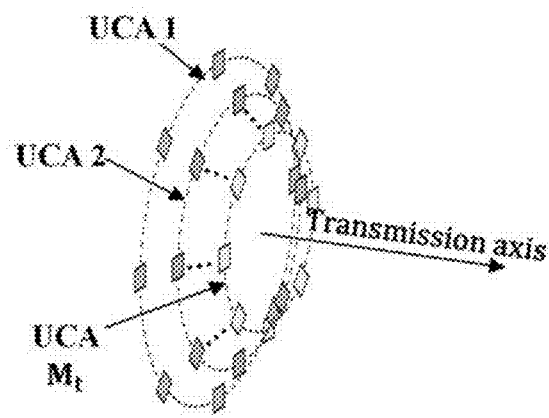
Figure 7C:
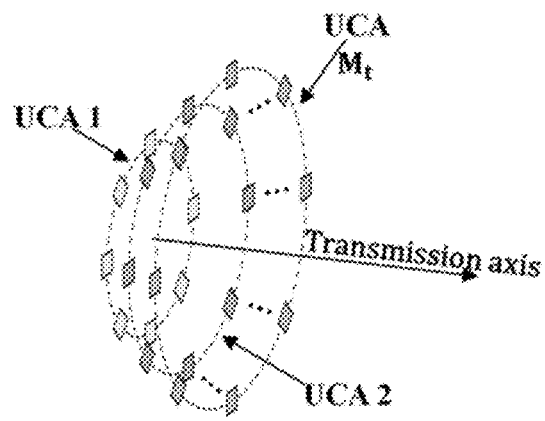

FIGS. 7A-7C show examples of concentric UCA structure antennas. FIGS. 7A-7C are a set of examples of antenna structures of a transmitter. It is self-evident that a receiver may have the corresponding antenna structure. FIG. 7A is a case in which a plurality of UCA antennas constituting concentric UCA antennas are arranged on the same plane on the basis of a signal transmission axis. FIGS. 7B and 7C are cases in which a plurality of UCA antennas constituting concentric UCA antennas are arranged on different planes on the basis of a signal transmission axis. FIG. 7B shows a form in which UCA 1 has the largest radius and the radii of UCAs are gradually reduced in a signal transmission direction (a convex shape). Contrary to FIG. 7B, FIG. 7C shows a form in which UCA 1 has the smallest radius and the radii of UCAs are gradually increased in a signal transmission direction (a concave shape).

Meanwhile, a concentric UCA structure antenna may have an arrangement different from FIGS. 7A-7C. For example, a plurality of UCA antennas constituting concentric UCA structure antennas may be arranged on different planes. In this case, the radii of the plurality of UCA antennas may not be increased or reduced in one direction. The plurality of UCA antennas may have a pattern of the same radius on the basis of one direction. Alternatively, the plurality of UCA antennas may have arbitrary radii rather than a pattern of the same radius on the basis of one direction.

Figure 8:
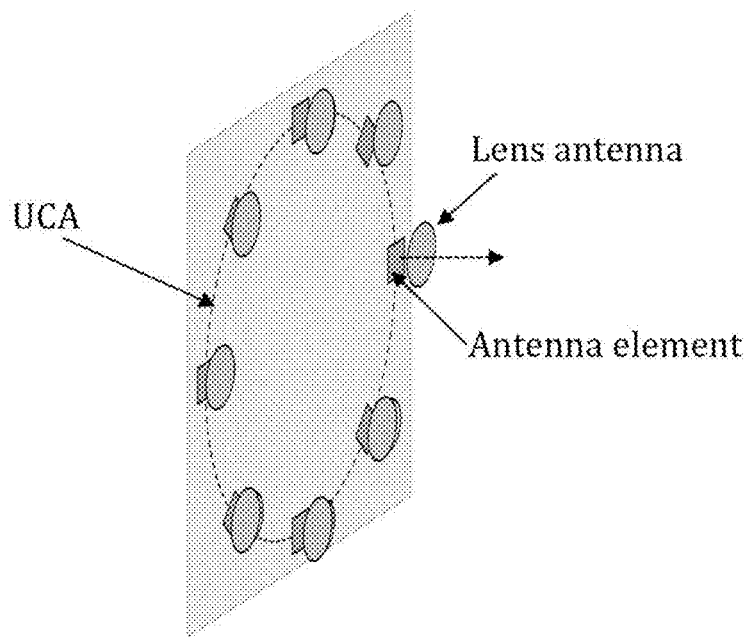
FIG. 8 shows another example of a concentric UCA structure antenna.

The antenna may further include various structures for increasing an antenna gain and directivity. FIGS. 8 and 9 show other examples of a concentric UCA structure antenna.

FIG. 8 shows another example of a concentric UCA structure antenna. An antenna element may be any one of various structures including a patch antenna. At least one of antenna elements may further include a lens structure (a lens antenna) in front thereof on the basis of a signal propagation direction (in the case of a transmitter, a signal transmission direction). In other words, a signal to be transmitted from the antenna element is transmitted through the lens structure.

Figure 9A:
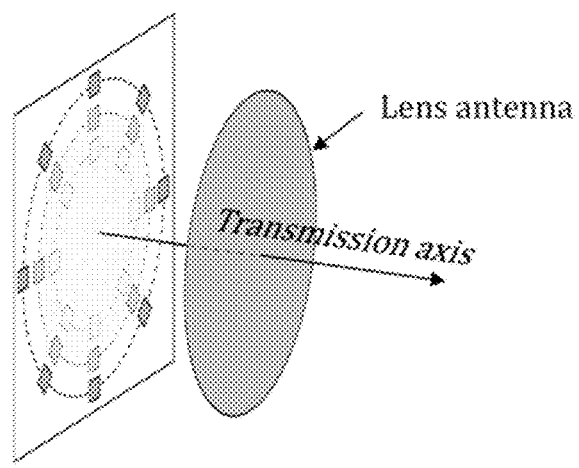
FIGS. 9A and 9B show still another example of a concentric UCA structure antenna.
Figure 9B:
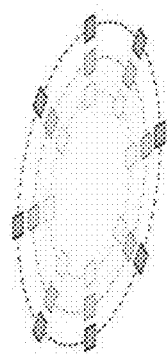

FIGS. 9A and 9B show still another example of a concentric UCA structure antenna. FIG. 9A is an example of a concentric UCA structure antenna of a transmitter, and FIG. 9B is an example of a concentric UCA structure antenna of a receiver. The concentric UCA structure antenna of the transmitter shown in FIG. 9A further includes a lens structure in front of UCA antennas on the basis of a signal transmission direction. Meanwhile, a plurality of lens structures may be arranged in the signal propagation direction.

Figure 10A:
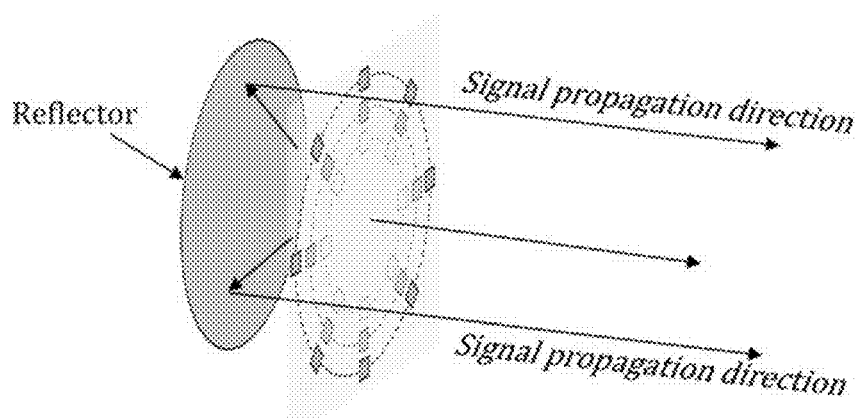
FIGS. 10A and 10B show yet another example of a concentric UCA structure antenna.
Figure 10B:
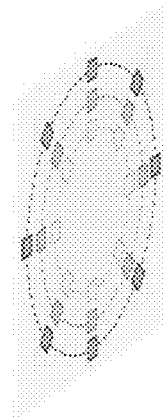

FIGS. 10A and 10B show yet another example of a concentric UCA structure antenna. FIG. 10A is an example of a concentric UCA structure antenna of a transmitter, and FIG. 9B is an example of a concentric UCA structure antenna of a receiver. The concentric UCA structure antenna of the transmitter shown in FIG. 10A further includes a reflector behind UCA antennas on the basis of a signal transmission direction. The reflector also helps to increase an antenna gain and directivity.

The above-described UCA antenna-based signal processing method and weight determination method may be implemented as a program (or application) including an algorithm which can be executed in a computer. The program may be stored and provided in a non-transitory computer-readable medium.

The non-transitory computer-readable medium indicates a device-readable medium for storing data semi-permanently rather than a medium, such as a register, a cache, or a memory which stores data for a short time. Specifically, the aforementioned application or program may be stored and provided in the non-transitory computer-readable medium, such as compact disc (CD), digital versatile disc (DVD), a hard disk, a Blu-ray disc, a Universal Serial Bus (USB) memory, a memory card, a read-only memory (ROM), a programmable ROM (PROM), an erasable PROM (EPROM), an electrically EPROM (EEPROM), or a flash memory.

A transitory computer-readable medium indicates various random access memories (RAMs) such as a static RAM (SRAM), a dynamic RAM (DRAM), a synchronous DRAM (SDRAM), a double data rate (DDR) SDRAM, an enhanced SDRAM (ESDRAM), a SyncLink DRAM (SLDRAM), and a direct Rambus RAM (DRRAM).

APPENDIX A

The solutions mentioned in Expressions 18 and 32 are described.

The optimization problem of finding f and w that maximize $J(w,f)=|w^{H}Af|^{2}$ under the constraints of $\|f\|^{2}=1$ and $\|w\|^{2}=1$ is written as $$\text{Maximize } J(z)$$
$$\text{subject to}$$
$$c_1(z) = 1$$
$$c_2(z) = 1$$

where $z=[w;\ f]$, $c_1(z)=\|w\|^2$ and $c_2(z)=\|f\|^2$. This kind of constrained optimization problem with equality constraints can be solved by use of the method of Lagrange multipliers as follows.

Let $\hat{z}=[\hat{w};\ \hat{f}]$ be a feasible point satisfying $c_1(\hat{z})=1$ and $c_2(\hat{z})=1$ at the same time.

Consider a smooth curve $z(t)$ with $z(0)=\hat{z}$ that remains on the constraints, i.e.

$$c_1(z(t))=1 \qquad (50)$$

$$c_2(z(t))=1 \qquad (51)$$

for all sufficiently small t.
Differentiating (50) and (51) gives $$\frac{\partial c_1(z(t))}{\partial t} = \left(\frac{\partial z(t)}{\partial t}\right)^T \nabla c_1(z(t))$$

$$\frac{\partial c_2(z(t))}{\partial t} = \left(\frac{\partial z(t)}{\partial t}\right)^T \nabla c_2(z(t))$$

which become $$p^T \nabla c_1(z)|_{z=\hat{z}} = 0 \qquad (52)$$

$$p^T \Delta c_2(z)|_{z=\hat{z}} = 0 \qquad (53)$$

$$p = \left.\frac{\partial z(t)}{\partial t}\right|_{t=0}.$$

at $t=0$ where
In addition, for $\hat{z}$ to be optimal, the rate of change of $J(z)$ at $t=0$ along $z$ should be zero at $\hat{z}$. Hence, differentiating $J(z)$ gives $$\frac{\partial J(z(t))}{\partial t} = \left(\frac{\partial z(t)}{\partial t}\right)^T \nabla J(z(t))$$

which becomes $$P^T \nabla J(z)|_{z=\hat{z}} = 0 \qquad (54)$$

at $t=0$.
To hold (52), (53), and (54) for all possible p, it must hold that (55)

$$\nabla J(z)|_{z=\hat{z}} = \lambda \nabla c_1(z)|_{z=\hat{z}} + \mu \nabla c_2(z)|_{\hat{z}=z}$$

for some scalar $\lambda$ and $\mu$ which are Lagrange multipliers, which can be written as $$\left.\frac{\partial J(w,f)}{\partial w^*}\right|_{w=\hat{w}} = \lambda \left.\frac{\partial \|w\|^2}{\partial w^*}\right|_{w=\hat{w}} + \mu \left.\frac{\partial \|f\|^2}{\partial w^*}\right|_{w=\hat{w}} \qquad (56)$$

$$\left.\frac{\partial J(w,f)}{\partial f^*}\right|_{f=\hat{f}} = \lambda \left.\frac{\partial \|w\|^2}{\partial f^*}\right|_{f=\hat{f}} + \mu \left.\frac{\partial \|f\|^2}{\partial f^*}\right|_{f=\hat{f}}. \qquad (57)$$

From the SVD of $A=U\Sigma V^H$, we have $$J(w,f)=|w^H A f|^2 = |w^H U\Sigma V^H f|^2 \qquad (58)$$

and thus, (56) and (57) become $$U\Sigma V^H \hat{f}\hat{f}^H V\Sigma U^H \hat{w} = \lambda \hat{w} \qquad (59)$$

$$V\Sigma U^H \hat{w}\hat{w}^H U\Sigma V^H \hat{f} = \mu \hat{f}. \qquad (60)$$

The optimal solutions, $\hat{w}$ and $\hat{f}$, that satisfy both (59) and (60) are found as follows. If we multiply $V\Sigma U^H \hat{w}\vec{w}^H$ on both sides of (59) and then apply (60), we get (61)

$$\mu \hat{f}\hat{f}^H V\Sigma U^H \hat{w} = \lambda V\Sigma U^H \hat{w}$$

and, by multiplying $U\Sigma V^H \hat{f}\hat{f}^H$ on both sides of (60), and then applying (59), we get $$\lambda \hat{w}\hat{w}^H U\Sigma V^H = \mu U\Sigma V^H \hat{f}. \qquad (62)$$

Then, by substituting (61) into (59), we get $$U\Sigma^2 U^H \hat{w} = \mu \hat{w} \qquad (63)$$

and, by substituting (62) into (60), we get $$V\Sigma^2 V^H \hat{f} = \lambda \hat{f}. \qquad (64)$$

Since (63) means that $\hat{w}$ is the eigenvector of $U\Sigma^2 U^H$, $\hat{w}$ is one of the singular vectors of A, and likewise, since (64) means that $\hat{f}$ is the eigenvector of $V\Sigma^2 V^H$, $\hat{f}$ is one of the right singular vectors of A.

Because $\hat{w}$ and $\hat{f}$ are singular vectors of A, we can see that the optimal values of w and f that maximize $J(w,f)$ in (58) are the singular vectors $u_{max}$ and $v_{max}$ corresponding to the maximum singular value. Accordingly, we get $$\hat{w}=e^{j\phi_w} u_{max},$$

$$\hat{f}=e^{j\phi_f} v_{max}$$

where $\phi_w$ and $\phi_f$ can be an arbitrary constant.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An orbital angular momentum (OAM)-based transmitter, the OAM-based transmitter comprising:
   a splitter configured to split a signal to be transmitted into signals corresponding to the number of radial concentric uniform circular array (UCA) antennas;

a plurality of modulators configured to perform OAM modulation on each of the signals split by the splitter; and a radial concentric UCA structure antenna including the plurality of UCA antennas configured to transmit the signals modulated by the plurality of modulators, wherein the plurality of UCA antennas each have the same number of antenna elements, wherein antenna elements having the same sequence number in the plurality of UCA antennas are on the same radial line in the radial concentric UCA structure antenna, wherein the splitter performs precoding by multiplying each branch, which is obtained by splitting a $k^{th}$ symbol of the signal to be transmitted, by an each individual weight, and wherein the weight is a part of singular vectors corresponding to a maximum singular value of a $k^{th}$ complex number diagonal element of a channel matrix constituted from the plurality of UCA antennas of the transmitter and a plurality of UCA antennas of a receiver.

2. The OAM-based transmitter of claim 1, wherein the signals split by the splitter are transmitted through UCA antennas, which are mapped to split sequence numbers, among the plurality of UCA antennas.

3. The OAM-based transmitter of claim 1, wherein, when the plurality of UCA antennas of the transmitter and a plurality of UCA antennas of a receiver are in a far-field distance region, the weight is a part of singular vectors corresponding to a maximum singular value of a $k^{th}$ real number diagonal element of a channel matrix constituted from the plurality of UCA antennas of the transmitter and the plurality of UCA antennas of the receiver.

4. An orbital angular momentum (OAM)-based receiver, the OAM-based receiver comprising:

a radial concentric uniform circular array (UCA) structure antenna including a plurality of UCA antennas configured to receive OAM multimode signals;

a plurality of demodulators configured to individually demodulate the multimode signals received by the plurality of UCA antennas;

a combiner configured to individually multiply the signals demodulated by the plurality of demodulators by combining weights and combine the weighted signals; and a symbol detector configured to detect a symbol in the signal combined by the combiner, wherein the plurality of UCA antennas each have the same number of antenna elements, wherein antenna elements having the same sequence number in the plurality of UCA antennas are on the same radial line in the radial concentric UCA structure antenna, and wherein the combiner applies the combining weights, which are mapped to sequence numbers of the plurality of UCA antennas, to the demodulated signals and combines the demodulated and weighted signals.

5. The OAM-based receiver of claim 4, wherein each of the weight is a part of singular vectors corresponding to a maximum singular value of a $k^{th}$ complex number diagonal element of a channel matrix constituted from the plurality of UCA antennas of the receiver and a plurality of UCA antennas of a transmitter.

6. The OAM-based receiver of claim 4, wherein, when the plurality of UCA antennas of the receiver and a plurality of UCA antennas of a transmitter are in a far-field distance region, the weight is a part of singular vectors corresponding to a maximum singular value of a $k^{th}$ real number diagonal element of a channel matrix constituted from the plurality of UCA antennas of the receiver and the plurality of UCA antennas of the transmitter.

7. An orbital angular momentum (OAM)-based communication method, the OAM-based communication method comprising:

transmitting, by a transmitter, OAM multimode signals through a uniform circular array (UCA)-based transmitting antenna; and receiving, by a receiver, the OAM multimode signals through a radial concentric UCA structure antenna including a plurality of UCA antennas, wherein the plurality of UCA antennas each have the same number of antenna elements, wherein antenna elements having the same sequence number in the plurality of UCA antennas may be on the same radial line in the radial concentric UCA structure antenna, and wherein the receiver individually demodulates the signals received by the plurality of UCA antennas, multiplies the demodulated signals by combining weights according to sequence numbers of the plurality of UCA antennas, and combines the weighted signals.

8. The OAM-based communication method of claim 7, wherein each of the weight is a part of singular vectors corresponding to a maximum singular value of a $k^{th}$ diagonal element of a channel matrix constituted from the plurality of UCA antennas of the receiver and a plurality of UCA antennas of the transmitter.

9. The OAM-based communication method of claim 7, wherein the transmitter includes a radial concentric UCA structure antenna including a plurality of UCA antennas, the plurality of UCA antennas of the transmitter each have the same number of antenna elements, and antenna elements having the same sequence number in the plurality of UCA antennas are on the same radial line in the radial concentric UCA structure antenna of the transmitter.

10. The OAM-based communication method of claim 9, wherein, to transmit a signal to be transmitted through the plurality of UCA antennas, the transmitter splits the signal to be transmitted and performs precoding on split signals by multiplying the split signals by weights according to split sequence numbers.

11. The OAM-based communication method of claim 10, wherein each of the weight is a part of singular vectors corresponding to a maximum singular value of a $k^{th}$ diagonal element of a channel matrix constituted from the plurality of UCA antennas of the transmitter and the plurality of UCA antennas of the receiver.

12. The OAM-based communication method of claim 10, wherein, when a distance between the plurality of UCA antennas of the transmitter and the plurality of UCA antennas of the receiver is a reference value or more and exceeds a far-field distance region, the weights are constants equal to combining weights of the receiver.

13. The OAM-based communication method of claim 7, wherein, in the radial concentric UCA structure antenna, the plurality of UCA antennas are arranged on the same plane or different planes on the basis of a central axis of the radial concentric UCA structure antenna.

14. The OAM-based communication method of claim 7, wherein the radial concentric UCA structure antenna further includes a lens structure in front of the plurality of antenna elements on the basis of a signal direction.

15. The OAM-based communication method of claim 7, wherein the radial concentric UCA structure antenna further includes a lens structure in front of the plurality of UCA antennas on the basis of a signal direction.

16. The OAM-based communication method of claim 7, wherein the radial concentric UCA structure antenna further includes a reflector behind the plurality of UCA antennas on the basis of a signal direction.

* * * * *